UNITED STATES PATENT OFFICE.

WILLIAM J. MELHUISH, OF PARKSTONE, ENGLAND.

SUBSTITUTE FOR MILK, MADE FROM SOYA-BEANS AND ARACHIS (PEA) NUTS.

1,243,855.     Specification of Letters Patent.     Patented Oct. 23, 1917.

No Drawing.     Application filed October 22, 1915. Serial No. 57,364.

*To all whom it may concern:*

Be it known that I, WILLIAM JAMES MELHUISH, a British subject, residing at Highwood House, Parkstone, in the county of Dorset, England, lecturer in dietetics, have invented a new and useful Substitute for Milk, Made from Soya-Beans and Arachis (Pea) Nuts, of which the following is a specification.

This invention relates to the production of a substitute for milk in the form of a milk-like fluid having practically the same characteristics as milk with reference to its food value, action and culinary properties. It supersedes my specification No. 24,572 of 1913, in that it requires less plant, saves time and expense in production, and there is no need to purchase refined oils for the normal cream building. To explain the invention in detail it will be best to describe the working process at length.

The ingredients necessary are pure water, arachis nuts, soya beans, a not-too-sweet sugar and various mineral salts.

As to quantities needed much will depend on the fat content of the arachis nuts to be used. It is not difficult to obtain samples yielding a total of 50 per cent. of oil, and if we take that as an average, we shall want 16 per cent. of the nuts by weight when ground ready for use. In the soya beans we shall want not more than 15 per cent. and care must be taken that these are of a clean and good quality. Names do not carry much weight in the various countries where these beans grow, but I have got very good results from the Manchurian beans known as Sakura, and from batches grown in South Africa under the names of Wilson, Haberlandt, and Hollybrook. It is perhaps sufficient to say that the beans must be of the white variety and of a clean and even growth.

For the sugar content I prefer the lighter malted dextrins in syrup form such as are used by brewers, and the neutral varieties suit best of all. I aim for a 4.5 per cent. content in the finished milk but the syrup as sold commercially contains varied quantities of water, sometimes as high as 25 per cent. and this moisture must be allowed for when weighing out the quantities for the process. For the sake of an example I will assume that I wish to make a brew of 300 pints of milk, which would give a final weight of practically 6000 ounces of milk (375 lbs.). It is best to think in pounds for the working of the formula in percentages is thus facilitated. I prepare the nuts (previously shelled) by boiling them for a few minutes in a bath of water mixed with carbonate of soda. Stirring well, the skins of the nuts will give up their color to the water, and one or two or three such washings may be necessary. At the stage of the work when the skins no longer tinge the water, they are partially dried by shaking on a sieve and then either placed in an oven until they are completely dried for storage, or if to be used at once can be left moist. Then they are ground up into a coarse flour and so far I have found nothing better than the ordinary household mincing or meat chopping machine, made sufficiently large for the purpose. The milling is dustless, requires very little power, and there is no waste except for the small quantity of oil which exudes around the delivery mouth of the machine, which sometimes becomes slightly soiled in the working and may thus have to be rejected.

I use the nuts with their skins on for the sake of economy in purchasing, and also for the fact that I get rather more of the valuable mineral salts by using the complete nut. I may however use nuts already blanched, or blanch them myself, and same may be either plain or roasted. Again, I have used the nuts in the form of a meal, ready ground, but get the best results by grinding myself.

I now provide 200 pints of water in a steam jacketed pan or other suitable vessel. This must have either been boiled or purified in other ways, and I require the water to commence with at 80 degrees C. I make the water alkaline by the addition of any suitable alkaline salts such as are usually found in cow's milk until delicate red litmus paper turns blue instantly.

I now add to the water two-thirds of the weight of the sugar syrup, or, of course, I may take some of the water to dissolve the syrup to make it flow more easily. Whatever the weight may be (depending as aforesaid on the moisture in the syrup) I always reserve one-third of the weight for use at a later stage.

After the addition of the sugar and its complete solution, I test with litmus again so as to insure constant alkalinity.

I now require to add the nut meal and as I need 16 per cent. by weight to the 200 pints of water (4,000 ounces) the exact amount is 640 ounces, or 40 lbs. The meal is poured into the water, stirring vigorously all the time, and the stirring has to be maintained for from 20 minutes to half an hour. The object in view is to extract the oil and legumin, emulsifying the former with the latter, and the sugar syrup helps in this emulsification—hence its addition at this stage. The liquor must be kept at a temperature varying from 75 degrees to 85 degrees C., and for this purpose a steam jacketed pan is most suitable, very little steam being wanted to keep the water up to this point with the exit valve of the steampipe open. When finished it is drawn off, strained through a cloth into a spare pan, and the meal, which with skilful straining remains on the cloth in one solid "roll" like form, is then removed to a press for the purpose of extracting as much of the water as possible. This water, obviously rich in solids, is added to the bulk pan and is all the better for being strained through a cloth in the operation. Indeed it may be remarked here that everything should be strained as one goes along. I now add to the bulk a small quantity of 50 per cent. butyric acid—a dessertspoonful would be sufficient, and as I add the acid drop by drop I get the liquor well stirred. This acid blends with the fat and gives a milk-like taste to the finished product, and it also adds to the whiteness of the milk as is obvious to any one watching the process. For pressing I may just say that nothing is better than the old-fashioned tincture press, and to save time I use three containing vessels and jackets—one set is pressing while another is being emptied and cleaned out after pressing, and the third being filled ready for the press. Of course, cloths have to be used as a press lining.

Next the soya beans must come under consideration. The beans are very hard, about as large as a gray pea, and they have to be ground into a coarse meal—some millers call it a fine kibble, but owing to the dust and the presence of an active enzym in the meal, should never be ground in the same building as that in which the milk is made.

As the working example under consideration provides for 300 pints of finished milk, and as the first stage of the process has taken up 200 pints, I have now to work out the remaining 100 pints (2,000 ounces or 125 pounds). This will require 15 per cent. of soya meal (300 ounces of 18¾ pounds). While the water is being boiled up in the feed tank and cooled down to 95 degrees C., I place the dry meal into a steam jacketed pan and allow it to get thoroughly hot, with a constant stirring, lifting and turning of the meal to insure the heat working through. This helps in two ways—first the heat in the meal tends to keep up the temperature of the water in which the extraction is to be made, and next the cooking removes the somewhat coarse flavor which the meal otherwise possesses. Not more than half an hour need be devoted to this preliminary work however, and then the water must be added gradually, with vigorous stirring, to insure an even taking up of the meal. In this way one can avoid lumps. A little phosphate is added—either sodium or potassium as may be preferred—and a test made with the litmus paper as to alkalinity, and then with a continued vigorous stirring and movement of the mass the work is continued for from 40 to 45 minutes. The object is to get all the soluble proteids into the water and in doing this sufficient oil cells are broken to insure 0.5 per cent. of oil in the resulting finished liquor. The heat should be kept up to 95° C. all through. At the end of the work the fluid is removed, strained, the meal pressed well, and the extracted water added to the bulk. As this soya extract takes much longer in time than the nut extract, it should be started earlier so that both fluids are finished at the same time.

It will be seen on examination that the nut extract is very milk-white in color, while the soya extract is a not-very-nice-looking yellow. The nut extract contains about 5 per cent. of fat, for all the oil in the nut can be extracted by the process and the resulting meal is practically fat free. The soya extract, on the other hand, will not contain more than one half of one per cent. but it should be made to contain that minimum. We have thus 200 pints of a 5 per cent. fat content and 100 with a fat content of 0.5 and the whole 300 will thus contain 3.5 per cent. of fat.

The vacuum pan is now made ready and pumped out without any steam in the jacket, and the two liquors sucked in at two opposite points, using a moderately fine reducing nozzle so that the feed may be in the form of a spray and blend completely in the pan. In this spray I effect a better subdivision of the fats which helps final emulsification. As the nut extract is twice the bulk of the soya, I feed in the remaining third of the sugar syrup at the same opening as the soya, adding a quantity of clear hot (previously boiled) water to dissolve the syrup and allow for the quantity of water which will be driven off by the vacuum, which must needs boil vigorously for at least 30 minutes.

Then the milk is drawn off into a reception tank, passing through a straining cloth of course, and if need be, made up to the 300 pints by the addition of clean cold water (previously boiled). On the other hand the output may be more than 300 pints, in which case it must be returned to the vacuum pan for further reduction.

Experience coupled with a carefully graded measuring rod in the vacuum pan itself, will soon insure an accurate output, requiring no addition and no re-working. At this stage it will generally be of the right temperature to be treated with a culture of lactic bacteria, which may be allowed to grow for a given time to get any degree of acidity required and then pasteurization at 60 to 70 degrees C. for at least 20 minutes, and cooling down; finally adding a due quantity of citric acid completes the process.

If the soya beans are not as clean as they should be, it may be found that a sediment falls when the milk stands in a test bottle for a few hours after cooling, and the milk may have to be strained again: but, if speed is an essential, as soon as it is cooled down, it may be passed through a cleaning separator of a type familiar to dairymen as a cream separator, but fitted with a blank for the purpose of removing sediment instead of the usual cream delivery.

The food value of the milk prepared in this way may be summed up as follows:—

Fats 3.5 per cent.
Proteids (legumin and albumins) not less than 3.5%.
Carbo-hydrate 4.5 per cent.

and salts may vary from 0.50 to 1 per cent. according to the results required.

The milk may be dried down to a powder, or condensed to any degree. It will yield a whiter condensed milk than soya milk does, while the flavor of the soya bean will be eradicated by the better tasting nut extract, which, with careful vacuum working, gives practically no flavor at all.

If a cream is desired, it will be necessary to add more fat, and for this purpose nothing is better than the tasteless cocoa-nut fat used by margarin people. While solid at ordinary temperatures, it emulsifies well with the milk, and should be added to the vacuum pan where a little longer boiling will efficiently mix.

The residue meals should be mixed together thoroughly and dried out to a ten per cent. moisture content. This should be done as soon as possible as the soya residue quickly ferments and becomes a sanitary menace. The combination makes an excellent cattle food for the oil in the soya meal (in excess) blends with the oil—free nut meal and gets over the extreme heating properties of the soya meal when used alone. The insoluble proteids in both meals, coupled with their carbo-hydrate residues tend to form an almost perfect food from a constitutent point of view, and its sale enables the cost of the milk to be brought down to something near three pence per gallon.

Having thus described my invention, what I claim as new and desire to secure by Letters Patent is:—

1. An artificial milk in which the nitrogenous principles and fat and a portion of the salts are produced from a combination of the arachis (pea) nut and soya beans, in which the obnoxious taste of the soya bean is entirely overcome and the necessity for added oils to make a normal cream content is abolished.

2. The herein described process of making a nut milk from arachis (pea) nuts and soya beans by the process of extracting the soluble nitrogenous principles and oil from the pea nut by cleaning the nuts, grinding coarsely and stirring the meal in an alkaline water containing a portion of the carbo-hydrate, straining and pressing the residue, adding butric acid: extracting the soluble nitrogenous principles from the soya bean with a minute portion of its fat by stirring the previously ground-up beans in an alkaline water, and straining and pressing same: sucking both fluids into a vacuum pan in two streams so that they combine and mix together: adding further water, carbo-hydrate and salts, boiling same under a vacuum of from 26 to 29 inches and then straining the finished liquor into a culture pan for treatment with milk bacteria and finally pasteurizing and cooling the fluid and adding citric acid ready for use.

3. The herein described process of making a nut milk from arachis (pea) nuts and soya beans by the process of extracting the soluble nitrogenous principles and oil from the pea nut by cleaning the nuts, grinding coarsely and stirring the meal in an alkaline water containing a portion of the carbo-hydrate, straining and pressing the residue and adding butyric acid: extracting the soluble nitrogenous principles from the soya beans with a minute portion of its fat by stirring the previously ground-up beans in an alkaline water, and straining and pressing same: sucking both fluids into a vacuum pan in two streams so that they combine and mix together: adding further water, carbo-hydrate and salts, boiling same under a vacuum of from 26 to 29 inches and then straining the finished liquor into a culture pan for treatment with milk bacteria ripening and adding citric acid: evaporating more or less of the water to make a concentrated milk.

4. The herein described process of making a nut milk from arachis (pea) nuts and soya beans by the process of extracting the soluble nitrogenous principles and oil from the pea nut by cleaning the nuts, grinding coarsely and stirring the meal in an alkaline water containing a portion of the carbo-hydrate, straining and pressing the residue and adding butyric acid: extracting the soluble nitrogenous principles from the soya beans with a minute portion of its fat by stirring the previously ground-up beans in an alkaline water, and straining and pressing same: sucking both fluids into a vacuum pan in two streams so that they combine and mix together: adding further quantities of any suitable fats for the purpose of making a cream, warmed up to say 40 degrees C., such fat being drawn into the vacuum pan in a finely divided state so as to insure a thorough mixing: adding further water, carbo-hydrate and salts, boiling same under a vacuum of from 26 to 29 inches and then passing the finished liquor into a culture pan for treatment with a cream starter, using sufficient of such starter to make a cream suitable for its ultimate use, and adding the needed citric acid.

In testimony whereof I affix my signature in the presence of two witnesses.

W. J. MELHUISH.

Witnesses:
 A. P. SULLY,
 P. W. SLINGSBY.

Copies of this patent may be obtained for five cents each, by addressing the "Commissioner of Patents, Washington, D. C."